United States Patent
Bruneau et al.

(10) Patent No.: US 9,919,943 B2
(45) Date of Patent: Mar. 20, 2018

(54) METHOD AND EQUIPMENT FOR MANUFACTURING A THIN, HOLLOW GLASS ITEM

(75) Inventors: Antoine Bruneau, Eu (FR); Nicolas Castex, Asnières-sur-Seine (FR); Denis Cavallucci, Otterswiller (FR); Sylvie Legastelois, Asnières-sur-Seine (FR); Olivier Perrin, Chatillon (FR)

(73) Assignee: POCHET DU COURVAL, Paris (FR)

( * ) Notice: Subject to any disclaimer, the term of this patent is extended or adjusted under 35 U.S.C. 154(b) by 1045 days.

(21) Appl. No.: 14/003,701

(22) PCT Filed: Mar. 9, 2012

(86) PCT No.: PCT/EP2012/054127
§ 371 (c)(1),
(2), (4) Date: Apr. 17, 2014

(87) PCT Pub. No.: WO2012/120119
PCT Pub. Date: Sep. 13, 2012

(65) Prior Publication Data
US 2014/0212606 A1    Jul. 31, 2014

(30) Foreign Application Priority Data

Mar. 10, 2011 (FR) .................................... 11 51962

(51) Int. Cl.
C03B 9/335    (2006.01)
C03B 9/32     (2006.01)
(Continued)

(52) U.S. Cl.
CPC ................ *C03B 9/335* (2013.01); *C03B 9/32* (2013.01); *C03B 9/344* (2013.01); *C03B 9/36* (2013.01);
(Continued)

(58) Field of Classification Search
CPC ......... C03B 9/347; C03B 9/32; C03B 9/3663; C03B 9/46; C03B 9/3841; C03B 9/344;
(Continued)

(56) References Cited

U.S. PATENT DOCUMENTS 2,725,683 A    12/1955  Lockhart
3,195,995 A *   7/1965  Rowe .................... C03B 9/1932
                                                        264/523
(Continued)

FOREIGN PATENT DOCUMENTS

GB         2436104 A      9/2007
JP      2004-018306 A     1/2004
(Continued)

OTHER PUBLICATIONS

International Search Report for International App. No. PCT/EP2012/054127 dated Jun. 6, 2012.
(Continued)

*Primary Examiner* — Queenie S Dehghan
(74) *Attorney, Agent, or Firm* — Knobbe, Martens, Olson & Bear, LLP (57) ABSTRACT

The invention relates to a method, comprising: feeding at least one molten-glass parison into a parison mold; forming, in the parison mold, a blank of an item from said at least one parison; transferring the blank of the item into a finishing mold; and forming the item in the finishing mold. While forming the item in the finishing mold, excess glass is directed out of the base of the item so as to form a convex bulge, and said bulge is removed such that the thickness of the base of the item is substantially constant.

5 Claims, 7 Drawing Sheets (51) Int. Cl.
*C03B 9/34* (2006.01)
*C03B 9/36* (2006.01)
*C03B 9/42* (2006.01)
*C03B 9/46* (2006.01)

(52) U.S. Cl.
CPC ............ *C03B 9/369* (2013.01); *C03B 9/3663* (2013.01); *C03B 9/42* (2013.01); *C03B 9/46* (2013.01); *Y10T 428/131* (2015.01)

(58) Field of Classification Search
CPC .. C03B 9/36; C03B 9/369; C03B 9/42; C03B 9/335
See application file for complete search history.

(56) References Cited

U.S. PATENT DOCUMENTS

| | | | |
|---|---|---|---|
| 3,468,648 A | 9/1969 | Nowak | |
| 4,052,187 A * | 10/1977 | Spaeth | C03B 9/1932 65/160 |
| 4,781,955 A | 11/1988 | Noe | |
| 5,183,673 A | 2/1993 | Schurman | |
| 5,713,975 A | 2/1998 | Schonfeld | |
| 5,876,478 A | 3/1999 | Imamura et al. | |
| 6,923,022 B1 | 8/2005 | Dodd | |
| 9,670,085 B2 | 6/2017 | Bruneau et al. | |
| 2007/0214838 A1 | 9/2007 | Fenton | |
| 2011/0067449 A1 | 3/2011 | Ringuette | |
| 2014/0212606 A1 | 7/2014 | Bruneau et al. | |
| 2015/0210582 A1 | 7/2015 | Mayeu et al. | |
| 2015/0246838 A1 | 9/2015 | Bruneau et al. | |

FOREIGN PATENT DOCUMENTS

| | | |
|---|---|---|
| JP | 2004-238242 A | 8/2004 |
| WO | WO 2012/120119 A1 | 9/2012 |
| WO | WO 2014/019893 A1 | 2/2014 |
| WO | WO 2014/044669 A1 | 3/2014 |

OTHER PUBLICATIONS

International Search Report & Written Opinion, dated Oct. 16, 2013, In International App. No. PCT/EP2013/065527.
International Search Report & Written Opinion, dated Dec. 20, 2013, In International App. No. PCT/EP2013/069257.
Office Action, dated Jun. 3, 2016, in U.S. Appl. No. 14/430,027.
Notice of Allowance, dated Feb. 1, 2017, in U.S. Appl. No. 14/430,027.

* cited by examiner

METHOD AND EQUIPMENT FOR MANUFACTURING A THIN, HOLLOW GLASS ITEM

CROSS-REFERENCE TO RELATED APPLICATIONS

This application is a U.S. National Phase of International Application No.: PCT/EP2012/054127, filed Mar. 9, 2012, designating the U.S., and published in English as WO 2012/120119 on Sep. 13, 2012, which claims the benefit of French Patent Application No. 11 51962 filed Mar. 10, 2011.

FIELD OF THE INVENTION

The present invention relates to a method and equipment for manufacturing a thin, hollow glass item, for example such as bottles or any other item of that type.

The invention also relates to a hollow glass item obtained using this method.

BACKGROUND OF THE INVENTION

In general, the manufacture of hollow glass items, for example such as bottles, must meet various constraints, and in particular shape constraints, for example the position of the neck, manufacturing tooling constraints, for example for stripping, constraints related to the distribution and weight of the glass, and specific constraints related to packaging.

One known method for manufacturing this type of item consists of introducing at least one molten glass parison into a parison mold at a predetermined temperature and preforming the article in the parison mold from said at least one parison by injecting a pressurized gas, for example such as air, into the parison mold.

The blank of the item thus produced is transferred into a finishing mold and the item is definitively formed in that finishing mold by also injecting a pressurized gas.

Until now, hollow glass items, and more particularly bottles intended for perfume and cosmetics, have been made with thick glass distributions, which is considered very qualitative and contributes to conveying an image of luxury. However, the trend is to produce hollow glass items with practically invisible glass walls so as to convey an image of lightness, refinement, elegance and apparent fragility.

To obtain this output on a hollow glass item that can be industrialized, several conditions must be met, i.e.:
  very thin glass thicknesses,
  the most regular possible distributions of glass to avoid disrupting the perception of the eye, and
  a sufficient mechanical strength for handling of the item.

With the aforementioned method, the adjustment of the parison mold and the geometry of the blank make it possible to obtain glass walls with a thin and regular thickness, but excess glass remains in the bottom of the item, centered on the axis of said item.

This excess forms a curved overthickness inside the item that specialists call a "marloquette" or a "police hat". This excess thickness disrupts the regularity of the distribution of the glass.

Furthermore, in light of the small thickness of the walls of the item, the distribution stresses of the glass impose a much higher manufacturing rhythm than those currently used for items having thicker walls. A gaseous interface forms between the blank and the walls of the finishing mold and is imprisoned during the blowing phase. This interface cannot escape due to a very small amount of time, thereby causing a deformation of the main faces of the item.

The invention aims to propose a method and equipment for manufacturing a thin, hollow glass item that avoids these drawbacks.

The invention therefore relates to a method for manufacturing a hollow glass item having thin walls and a thin bottom, said method comprising:
  feeding at least one molten-glass parison into a parison mold,
  forming, in the parison mold, a blank of the item from said at least one parison,
  transferring the blank of the item into a finishing mold,
  forming the item in the finishing mold,
characterized in that, while forming the item in the finishing mold, excess glass is directed out of the bottom of the item so as to form a convex bulge, and the bulge is removed such that the thickness of the bottom of the item is substantially constant.

According to other features of the invention:
  during forming of the item in the finishing mold, the gas forming between the main faces of the walls of the item and the inner walls of said finishing mold is channeled toward the outside of said finishing mold, and
  the outer bulge is eliminated from the bottom of the item by at least one cutting operation followed by at least one polishing operation of the outer face of the bottom of the item.

SUMMARY OF THE INVENTION

The invention also relates to equipment for manufacturing a hollow glass item including thin walls and a thin bottom, said equipment comprising:
  at least one distributor of molten glass parisons,
  a parison mold including a cavity intended to successively receive at least one molten glass parison,
  means for forming a blank of said item in the parison mold,
  means for transferring the blank into a cavity of a finishing mold,
  means for forming the item in the finishing mold,
characterized in that the cavity of the finishing mold includes a bottom provided with a concave hollow for forming on the bottom of the item a convex bulge oriented toward the outside of said item, and in that the equipment comprises means for eliminating the bulge to obtain the bottom of the item with a substantially constant thickness.

According to other features of the invention:
  the finishing mold includes at least one vent for channeling the gas forming between the main faces of the walls of the item and the inner walls of the finishing mold toward the outside of said mold, and
  the equipment includes means cutting for the outer bulge of the bottom and means for polishing the outer face of the bottom of the item.

The invention also relates to a hollow glass item having thin walls and a thin bottom, obtained using the method previously defined, characterized in that the side walls have a thickness comprised between 0.5 and 3 mm, preferably of approximately 1 mm, and the bottom has a thickness comprised between 1.5 and 4 mm.

BRIEF DESCRIPTION OF THE DRAWINGS

The features and advantages of the invention will appear in the following description, provided as an example and done in reference to the appended drawings, in which.

DETAILED DESCRIPTION OF THE EMBODIMENTS

Figure 8:
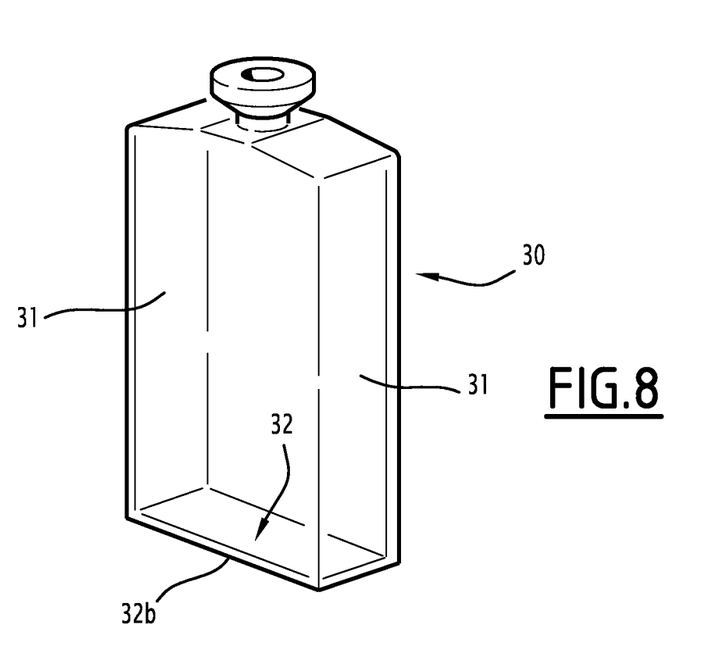
FIG. 8 is a diagrammatic perspective view of the final hollow glass item.

Hereafter, the equipment for implementing the method according to the invention will be described for manufacturing a hollow glass item 30, for example a bottle with a generally parallelepiped shape including thin side walls 31 and a thin bottom 32, as shown in FIG. 8. The side walls 31 have a thickness comprised between 0.5 and 3 mm, and preferably approximately 1 mm, and the bottom 32 has a thickness comprised between 1.5 and 4 mm.

Of course, this equipment also makes it possible to manufacture hollow items with various shapes and a small thickness.

Figure 1:
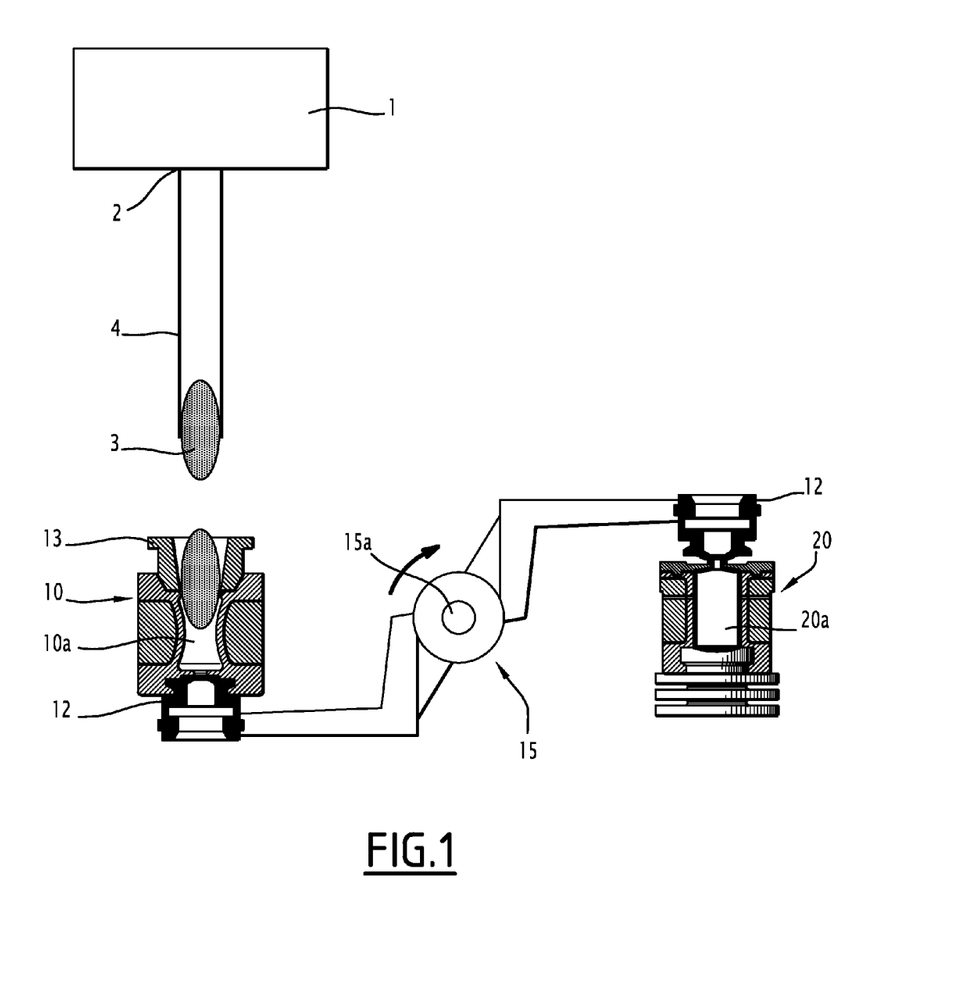
FIG. 1 is a diagrammatic view of part of equipment for manufacturing a thin, hollow glass item, according to the invention.

As shown in FIG. 1, the equipment includes a molten glass distributor 1 placed in a furnace, not shown, and a parison mold generally designated by reference 10.

The distributor 1 of the known type delivers, at the outlet of a pouring orifice 2, a parison 3 which, traditionally, is cut using scissors, not shown.

At the outlet of the distributor 1, the parison 3 falls into a duct 4 which conveys it to the parison mold 10 including a cavity 10a for forming a blank 5. To that end, the cavity 10a of the parison mold 10 includes a funnel 13 at its inlet.

Figure 2:
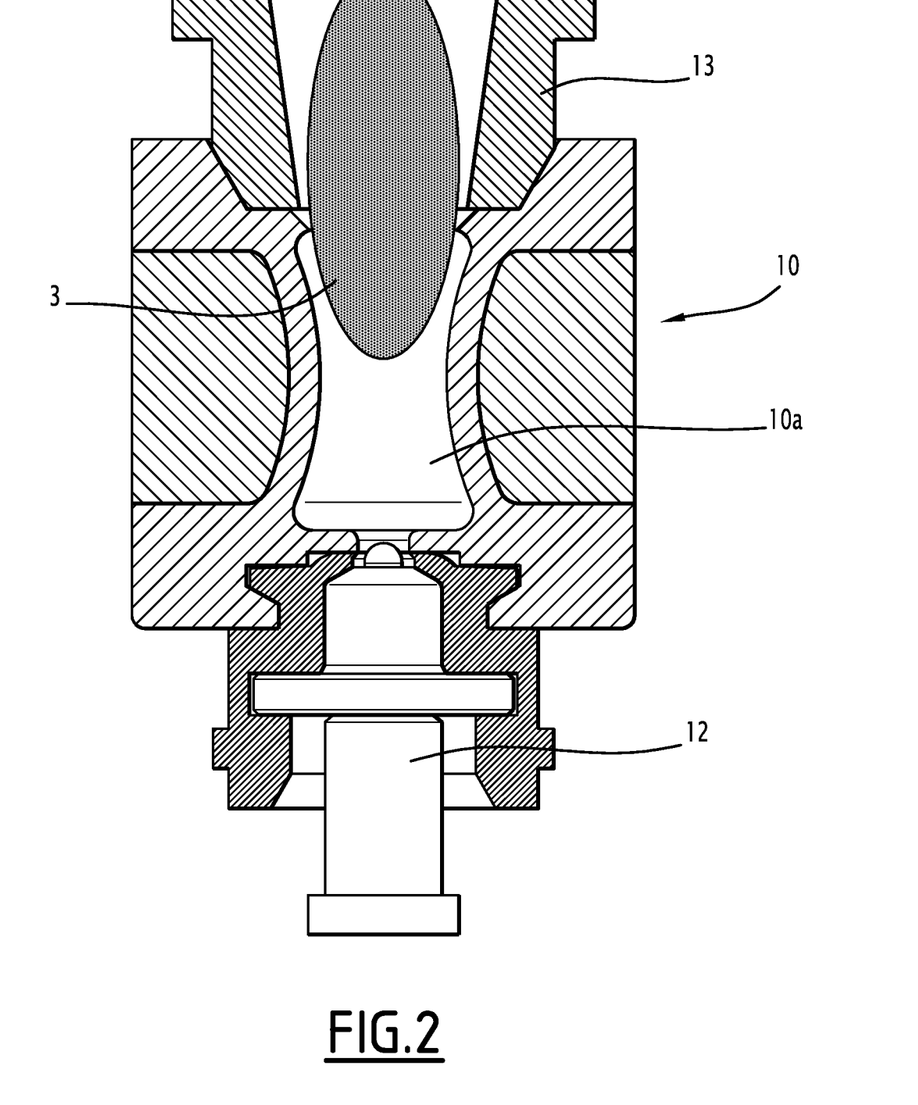
FIGS. 2 to 6 are diagrammatic vertical cross-sectional views of the parison mold and the finishing mold of the equipment, respectively, according to the invention.

As shown diagrammatically in FIG. 2, the lower part of the parison mold 10 includes a blower nozzle 12 connected to a pressurized gas supply device, for example such as air, not shown.

Figure 3:
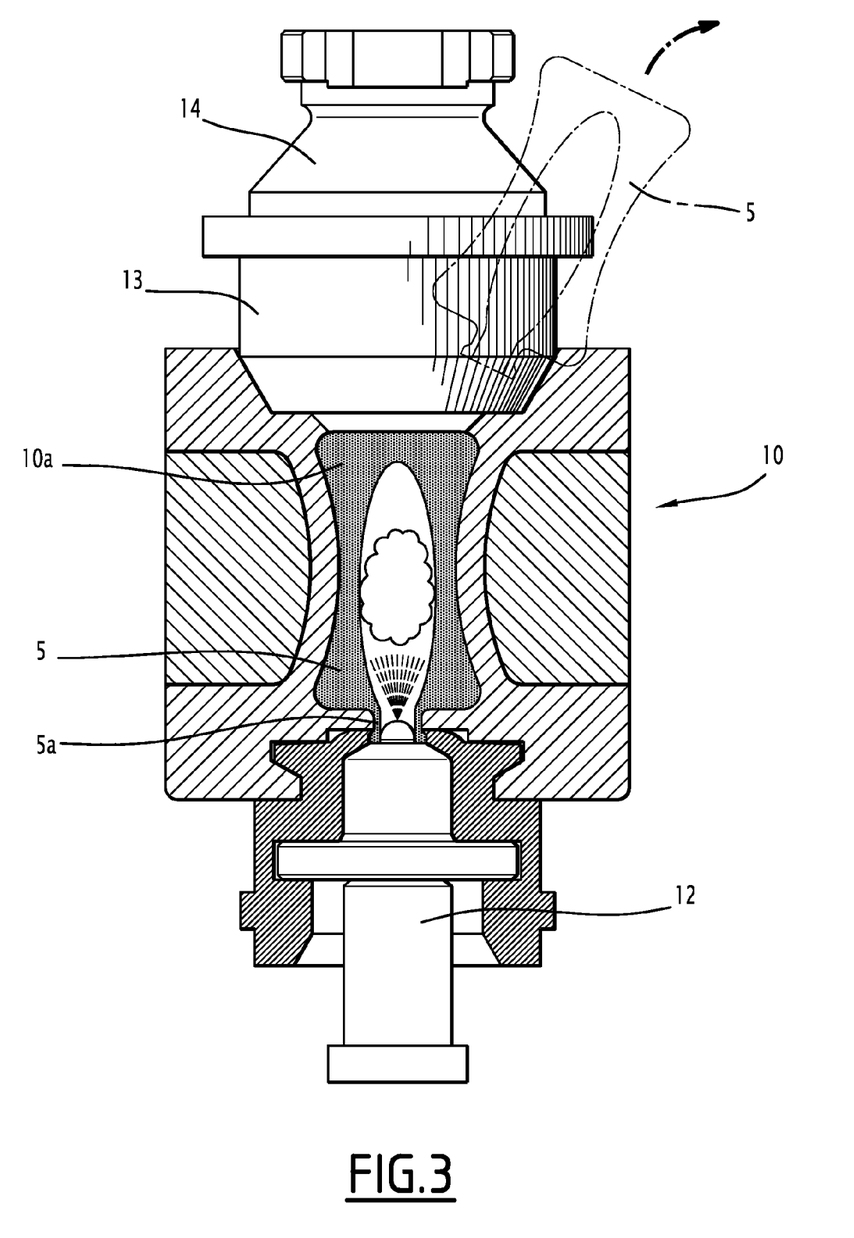

Once the parison 3 is introduced into the cavity 10a of the parison mold 10, a bottom 14 is placed on the funnel 13 on the upper opening of said parison mold, and pressurized air is injected through the blower nozzle 12 to compact the glass and form a ring 5a on the blank 5, as shown in FIG. 3. The bottom 14 is then raised to make it possible to remove the funnel 13. This bottom 14 is positioned on top of the parison mold 10, making it possible to shape the bottom of the blank 5, and pressurized air is blown through the nozzle 12.

The blank 5 of the item 30 is thus obtained.

Figure 4:
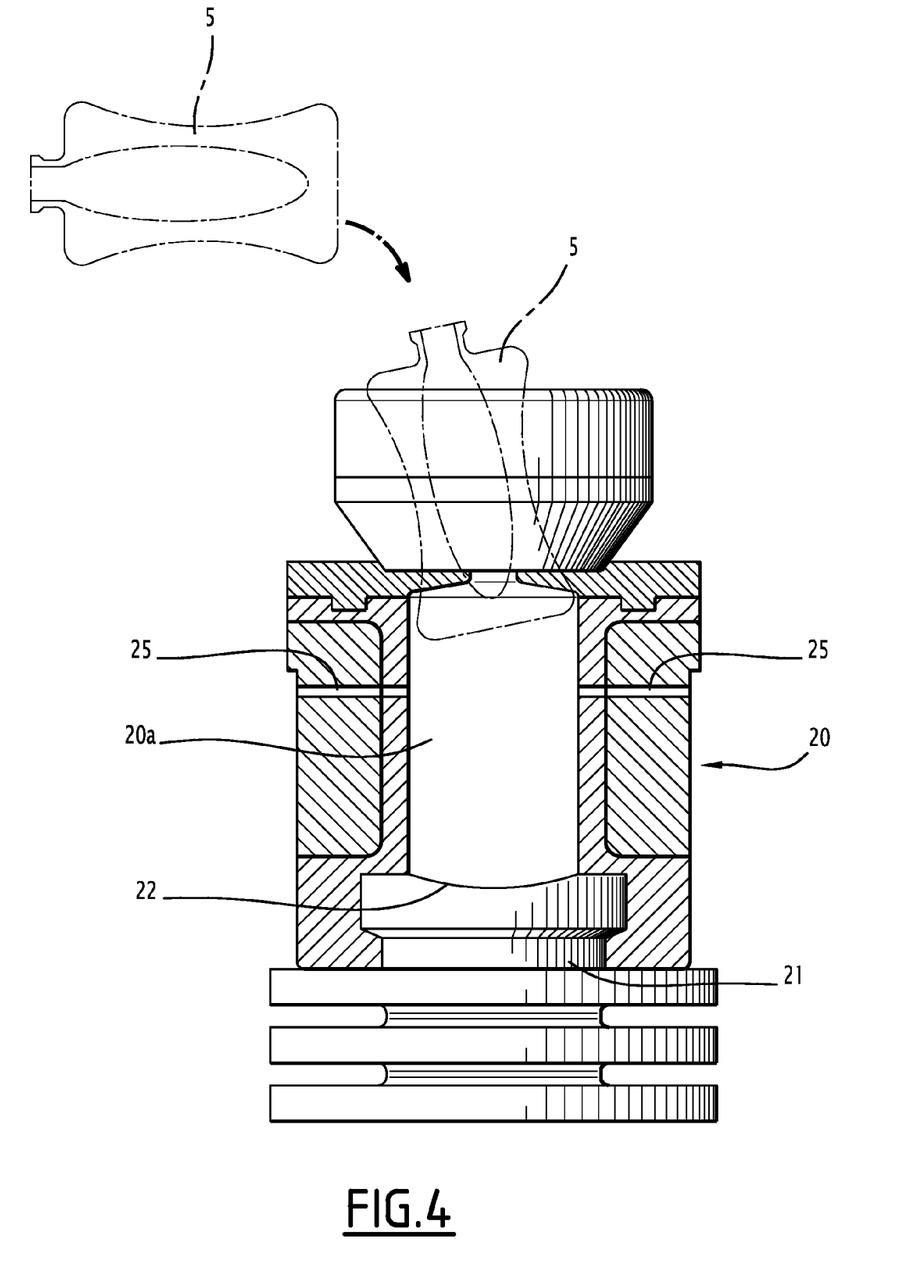
Figure 5:
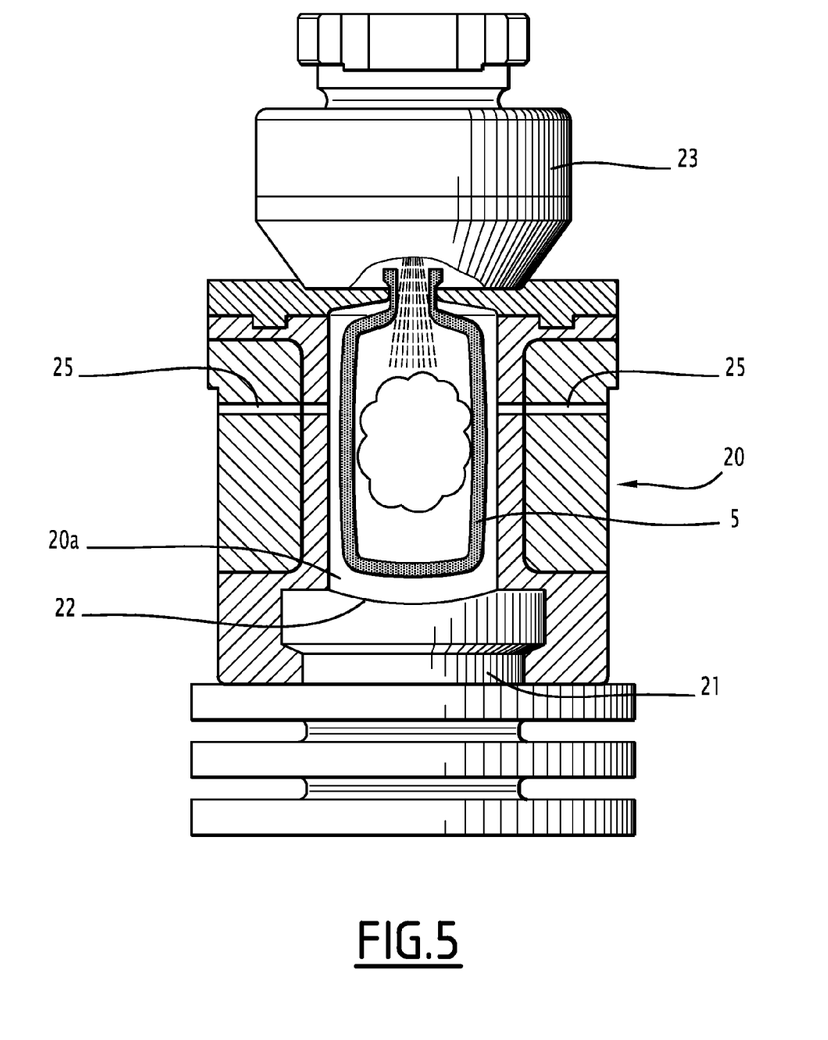
Figure 6:
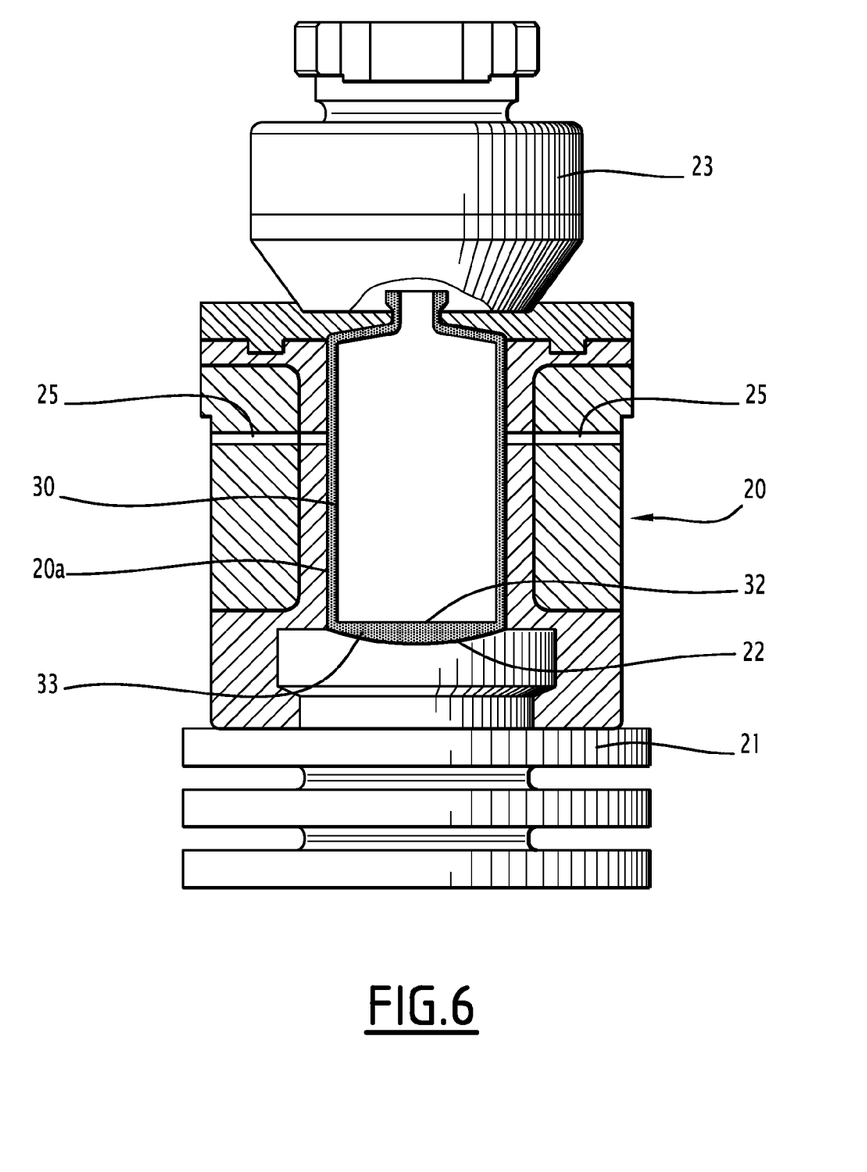

Thus, the blank 5 is stripped and transferred by a handling arm 15 (FIG. 1) pivoting around an axis 15a, in a finishing mold 20 diagrammatically shown in FIGS. 4 to 6. This finishing mold 20 includes a cavity 20a, the lower part of which is covered by a removable bottom 21. This removable bottom 21 makes it possible to shape the bottom 32 of the item 30 to be obtained.

As appears in FIGS. 4 to 6, the bottom 21 of the cavity 20a includes a concave hollow 22. When the blank 5 has been introduced into the finishing mold 20 (FIG. 5), a blower nozzle 23 is mounted on the upper part of the finishing mold 20, said blower nozzle being connected to a device supplying pressurized gas, for example such as air (not shown).

After this operation, pressurized gas is blown into the blank 5 so as to form the item 30 (FIG. 6).

Figure 7:
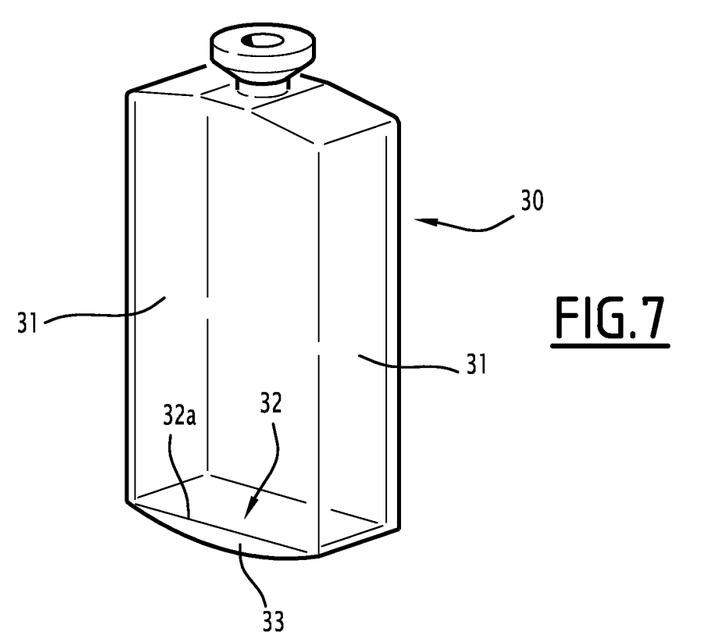
FIG. 7 is a diagrammatic view of a hollow glass item obtained after the forming step in the finishing mold.

During the forming of said item 30 in the finishing mold 20, the excess glass is housed in the hollow 22 formed in the bottom 21 of said finishing mold 21 forming, toward the outside of the bottom of the item 30, a convex bulge 33, as shown in FIG. 7. Thus, the inner distribution of the bottom 32 of the item 30 subsides in the hollow 22 and the inner face 32a of the bottom 32 becomes horizontal.

The item 30 obtained the finishing mold 20 is shown in FIG. 7 and is stripped from that finishing mold 20 by removing the removable bottom 21.

Next, to eliminate the outer bulge 33 thus formed, the operators perform at least one cutting operation followed by at least one polishing operation of the outer face 32b of the bottom 32 of the item 30 so as to obtain a bottom 32 with a substantially constant thickness, as shown in FIG. 8.

During the forming operation in the finishing mold 20, to allow the gaseous cushion that forms between the main faces of the blank 5 and the inner walls of the cavity 20a of said finishing mold 20, said finishing mold 20 includes at least one vent designated by reference 25 in FIGS. 4 to 6.

In the example embodiment shown in these figures, each vent 25 is formed by a duct formed in the walls of the finishing mold 20. Each vent 25 inwardly includes an element allowing the gas to escape, while preventing the molten glass from flowing through that vent. Each vent 25 may be formed by any other arrangement in the finishing mold 20.

Hot and cold chemical treatments may be done on the item 30 so as to reinforce the outer surface of the glass.

The method according to the invention makes it possible to be able to obtain a thin, hollow glass item having a homogenous distribution of the glass and having the requisite solidity for this type of item despite the small thickness of the side walls and the bottom.

What is claimed is:

1. A method for manufacturing a hollow glass item comprising walls and a bottom, said method comprising:
    feeding at least one molten-glass parison into a parison mold,
    forming, in the parison mold, a blank of the item from said at least one parison,
    transferring the blank of the item into a finishing mold,
    forming the item in the finishing mold, wherein while forming the item in the finishing mold, excess glass is directed out of the bottom of the item so as to form a convex bulge, and
    removing the convex bulge such that the thickness of the bottom of the item is substantially constant.

2. The method of claim 1, wherein during forming the item in the finishing mold, the gas forming between the main faces of the walls of the item and the inner walls of said finishing mold is channeled toward the outside of said finishing mold.

3. The method of claim 1, further comprising:
    at least one cutting step to eliminate the outer bulge from the bottom of the item; and
    at least one polishing step applied to an outer face of the bottom of the item.

4. The method of claim 1, wherein removing the convex bulge is performed by an apparatus configured to eliminate the convex bulge to obtain a substantially constant thickness of the bottom of the item.

5. The method of claim 1, wherein the walls of the hollow glass item have a thickness of between 0.5 and 3 mm, and the bottom of the hollow glass item has a thickness of between 1.5 and 4 mm.

* * * * *